Figure 1:
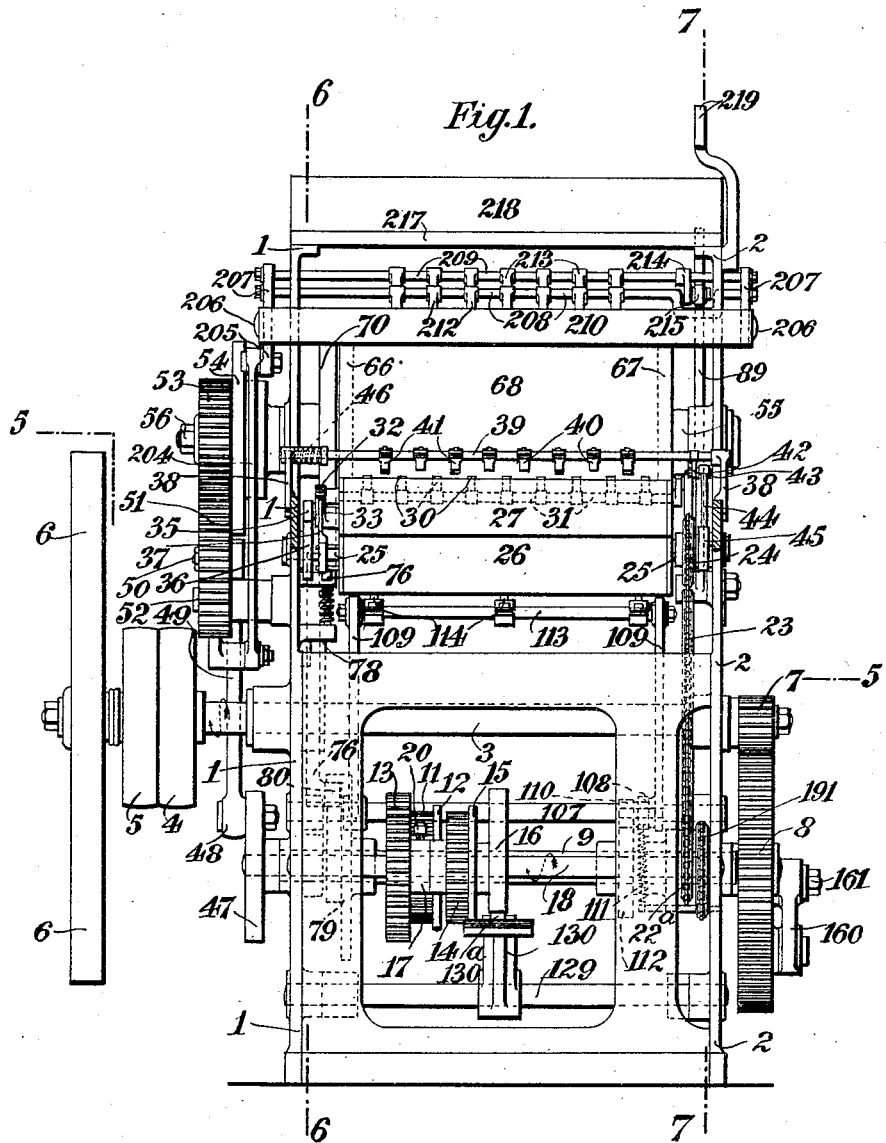

No. 774,040. PATENTED NOV. 1, 1904.
E. T. CLEATHERO.
PLATEN PRESS.
APPLICATION FILED MAY 20, 1901.
NO MODEL. 19 SHEETS—SHEET 1.

Witnesses.
Horace Grellier
Robert E. McLaren.

Inventor
Edward Thomas Cleathero
per Chas. S. Woodroffe
Attorney.

No. 774,040. PATENTED NOV. 1, 1904.
E. T. CLEATHERO.
PLATEN PRESS.
APPLICATION FILED MAY 20, 1901.
NO MODEL. 19 SHEETS—SHEET 5.

Witnesses
Horace Grellier.
Robert E. McLaren.

Inventor
Edward Thomas Cleathero
per Chas S Woodroffe
Attorney.

No. 774,040. PATENTED NOV. 1, 1904.
E. T. CLEATHERO.
PLATEN PRESS.
APPLICATION FILED MAY 20, 1901.
NO MODEL. 19 SHEETS—SHEET 7.

Witnesses
Horace Grellier
Robert E. McLaren

Inventor
Edward Thomas Cleathero
per Arnas S. Woodroffe
Attorney.

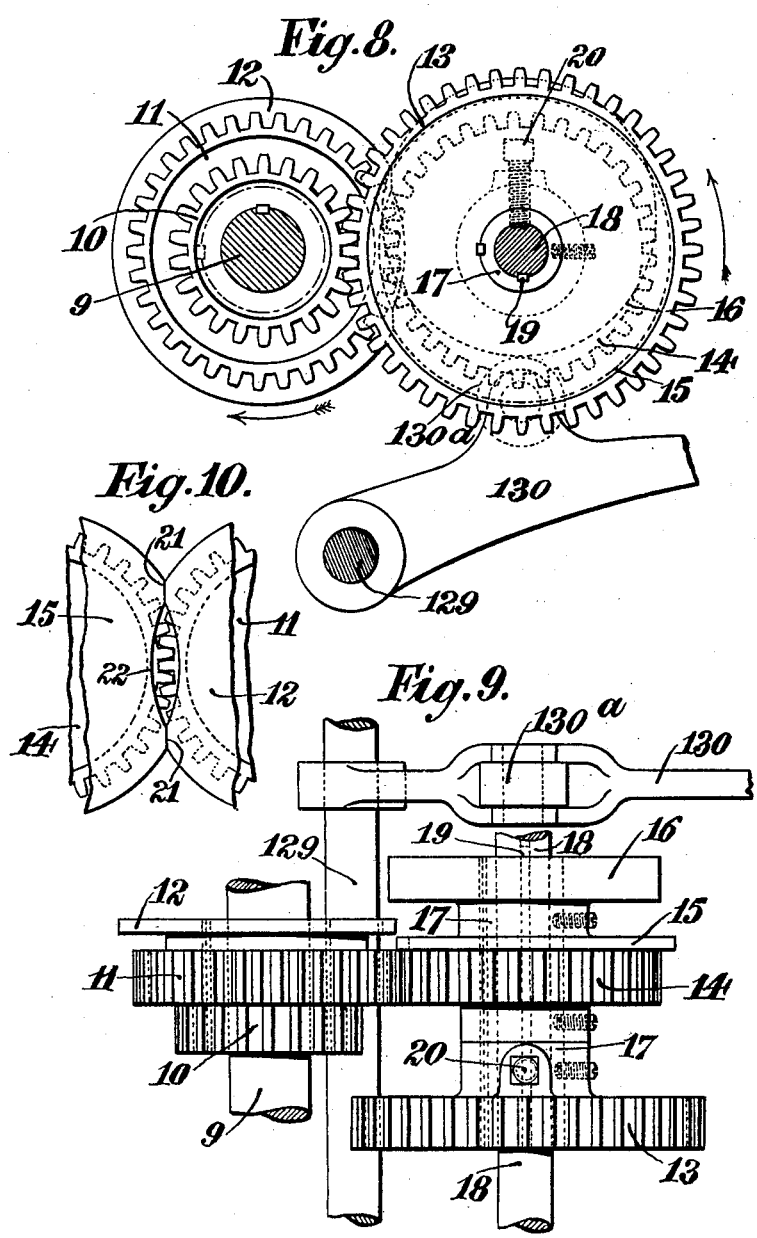

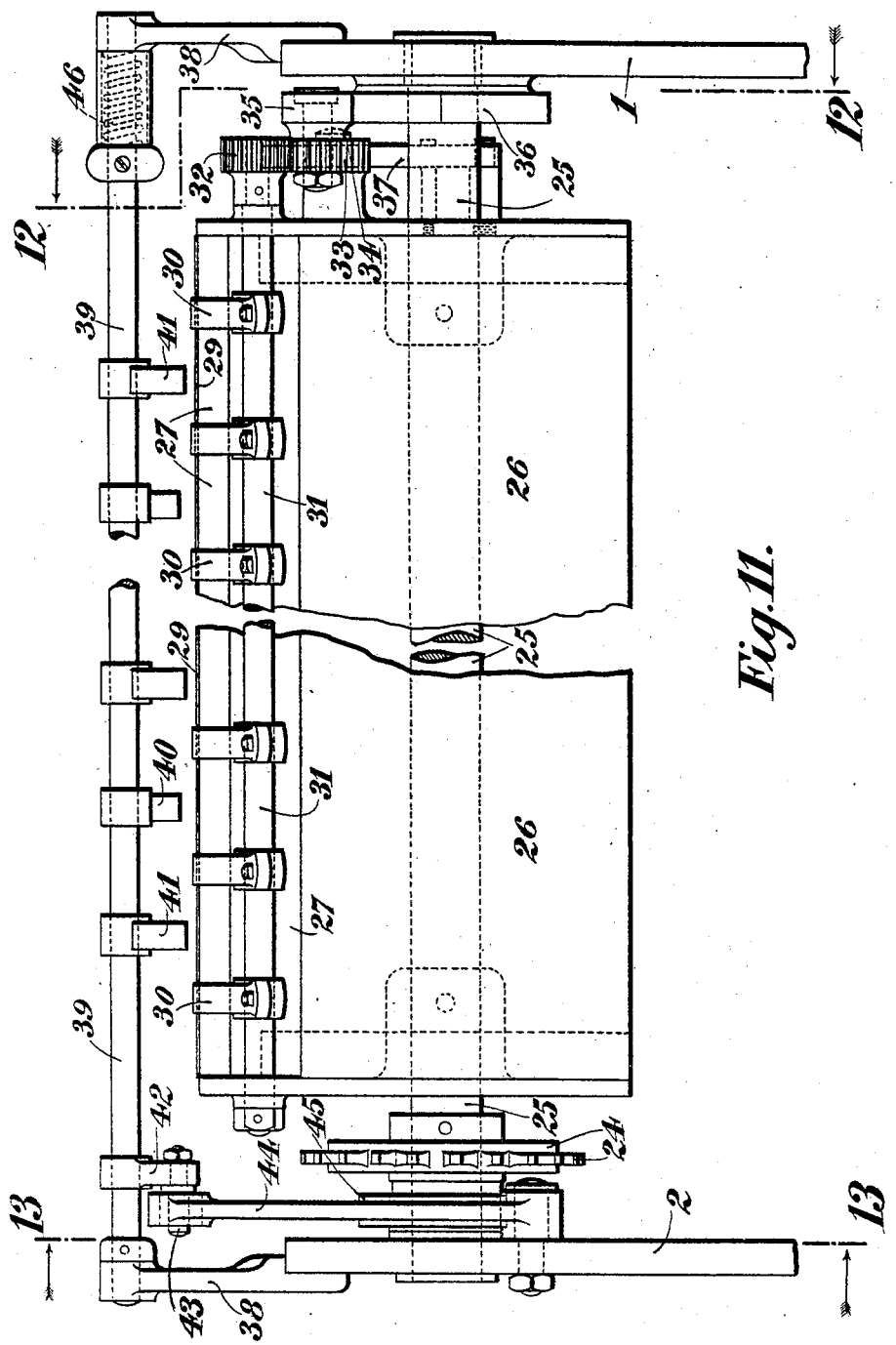

No. 774,040. PATENTED NOV. 1, 1904.
E. T. CLEATHERO.
PLATEN PRESS.
APPLICATION FILED MAY 20, 1901.
NO MODEL. 19 SHEETS—SHEET 10.

Witnesses.
Horace Grellier.
Robert E. McLaren

Inventor
Edward Thomas Cleathero
per Chas. S. Woodroffe
Attorney.

No. 774,040. PATENTED NOV. 1, 1904.
E. T. CLEATHERO.
PLATEN PRESS.
APPLICATION FILED MAY 20, 1901.
NO MODEL. 19 SHEETS—SHEET 11.

Witnesses
Horace Grellier.
Robert E. McLaren.

Inventor
Edward Thomas Cleathero
per Chas S Woodroffe
Attorney.

No. 774,040. PATENTED NOV. 1, 1904.
E. T. CLEATHERO.
PLATEN PRESS.
APPLICATION FILED MAY 20, 1901.
NO MODEL. 19 SHEETS—SHEET 13.

Witnesses
Horace Grellier.
Robert E. McLaren.

Inventor
Edward Thomas Cleathero.
per Chas S Woodroffe,
Attorney.

No. 774,040. PATENTED NOV. 1, 1904.
E. T. CLEATHERO.
PLATEN PRESS.
APPLICATION FILED MAY 20, 1901.
NO MODEL. 19 SHEETS—SHEET 14.

Witnesses
Horace Grellier
Robert E. McLaren

Inventor
Edward Thomas Cleathero
per Chas S Woodroffe
Attorney

No. 774,040. PATENTED NOV. 1, 1904.
E. T. CLEATHERO.
PLATEN PRESS.
APPLICATION FILED MAY 20, 1901.
NO MODEL. 19 SHEETS—SHEET 15.

Witnesses
Horace Grellier.
Robert E. McLaren.

Inventor
Edward Thomas Cleathero
per Chas. S. Woodroffe
Attorney.

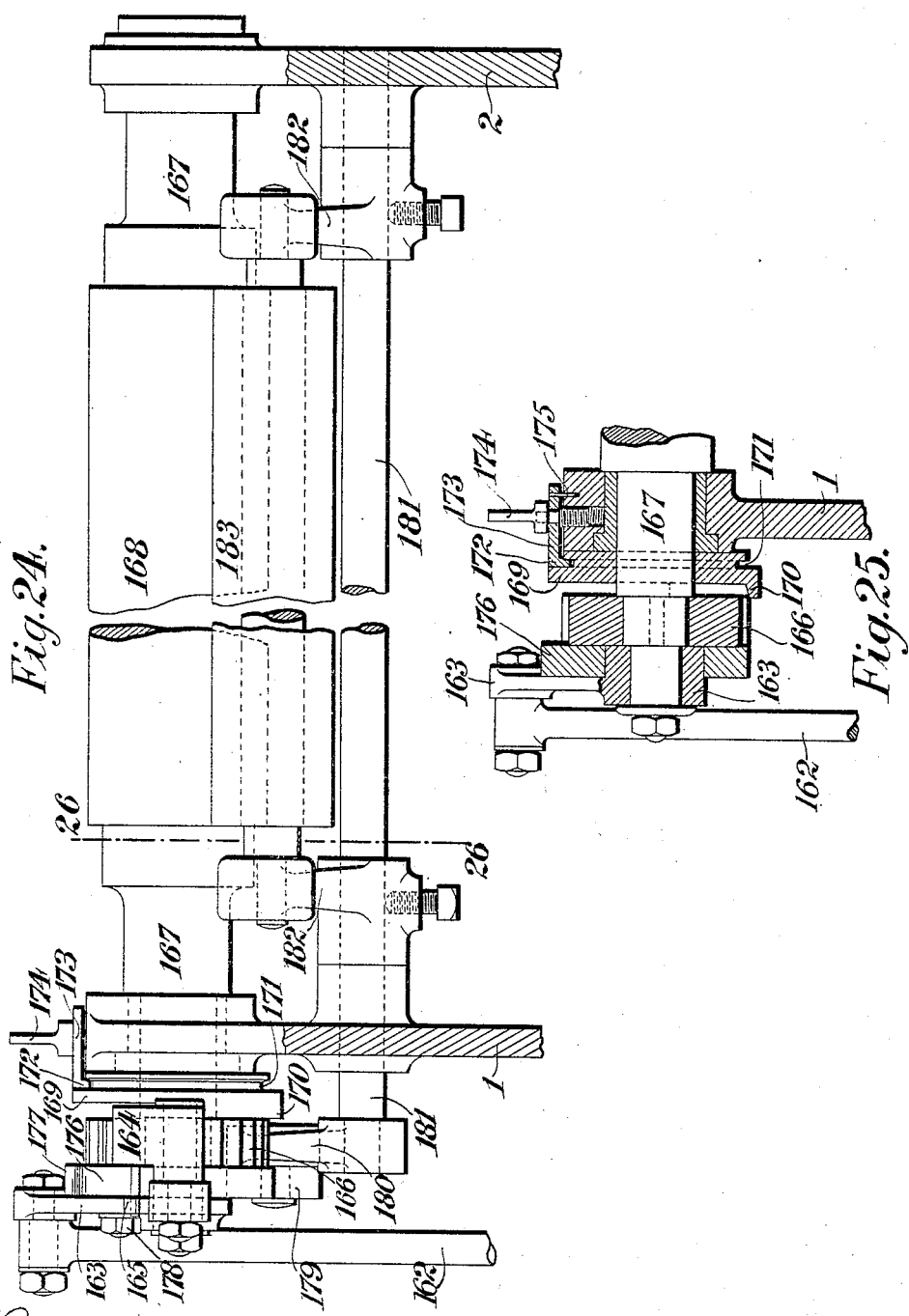

No. 774,040. PATENTED NOV. 1, 1904.
E. T. CLEATHERO.
PLATEN PRESS.
APPLICATION FILED MAY 20, 1901.

NO MODEL. 19 SHEETS—SHEET 18.

Witnesses.
Horace Grellier.
Robert E. McLaren.

Inventor
Edward Thomas Cleathero
per Chas. S. Woodroffe
Attorney.

No. 774,040. PATENTED NOV. 1, 1904.
E. T. CLEATHERO.
PLATEN PRESS.
APPLICATION FILED MAY 20, 1901.
NO MODEL. 19 SHEETS—SHEET 19.

Witnesses.
Horace Grellier.
Robert E. McLaren.

Inventor
Edward Thomas Cleathero
per Hans S. Woroloff
Attorney.

No. 774,040. Patented November 1, 1904.

UNITED STATES PATENT OFFICE.

EDWARD THOMAS CLEATHERO, OF ALTRINCHAM, ENGLAND.

PLATEN-PRESS.

SPECIFICATION forming part of Letters Patent No. 774,040, dated November 1, 1904.

Application filed May 20, 1901. Serial No. 61,124. (No model.)

*To all whom it may concern:*

Be it known that I, EDWARD THOMAS CLEATHERO, of The Hollies, Barrington Road, Altrincham, in the county of Chester, England, have invented certain new and useful Improvements in Platen-Presses; and I do hereby declare the following to be a full, clear, and exact description of the invention, such as will enable others skilled in the art to which it appertains to make and use the same.

This invention relates to platen-presses such as are used for printing, stamping, and the like, and will be best understood by reference to the accompanying drawings, in which—

Figure 2:
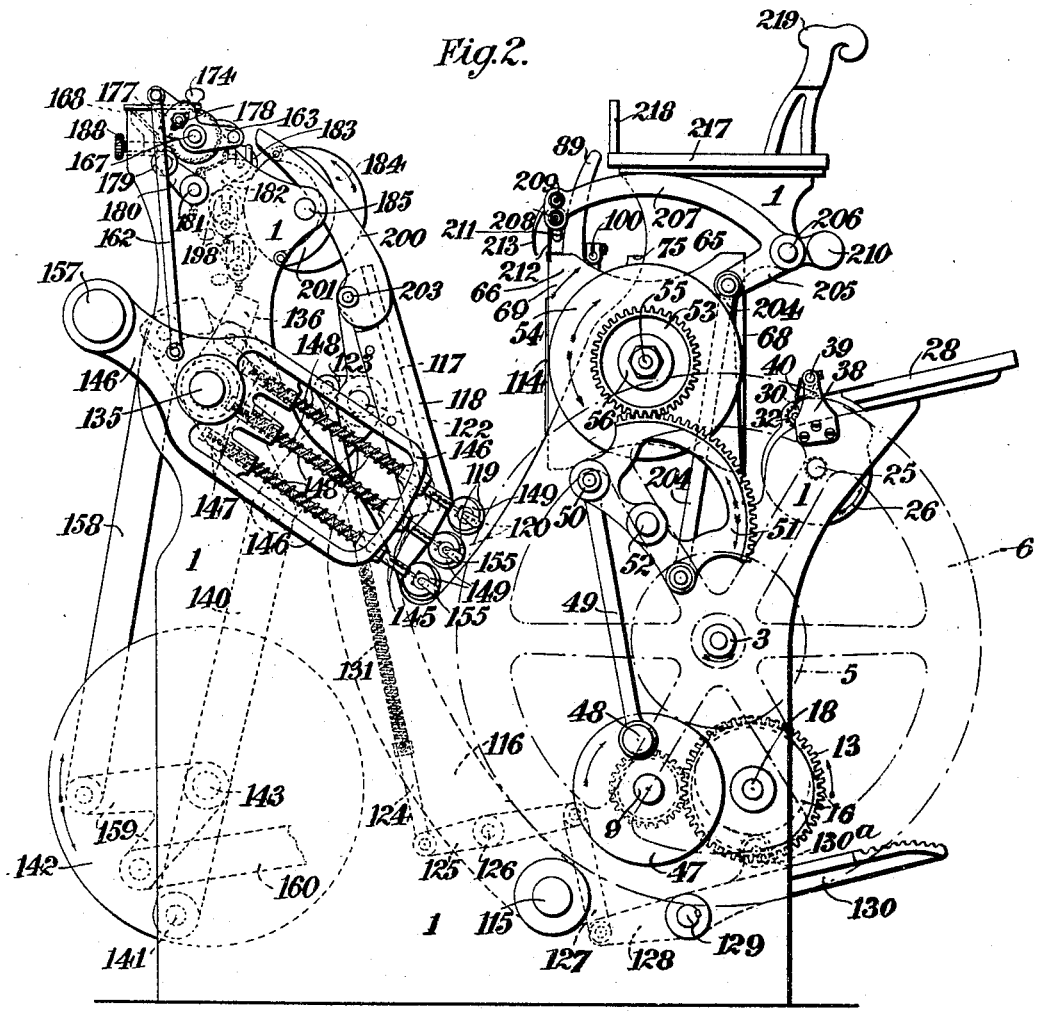
Figure 3:
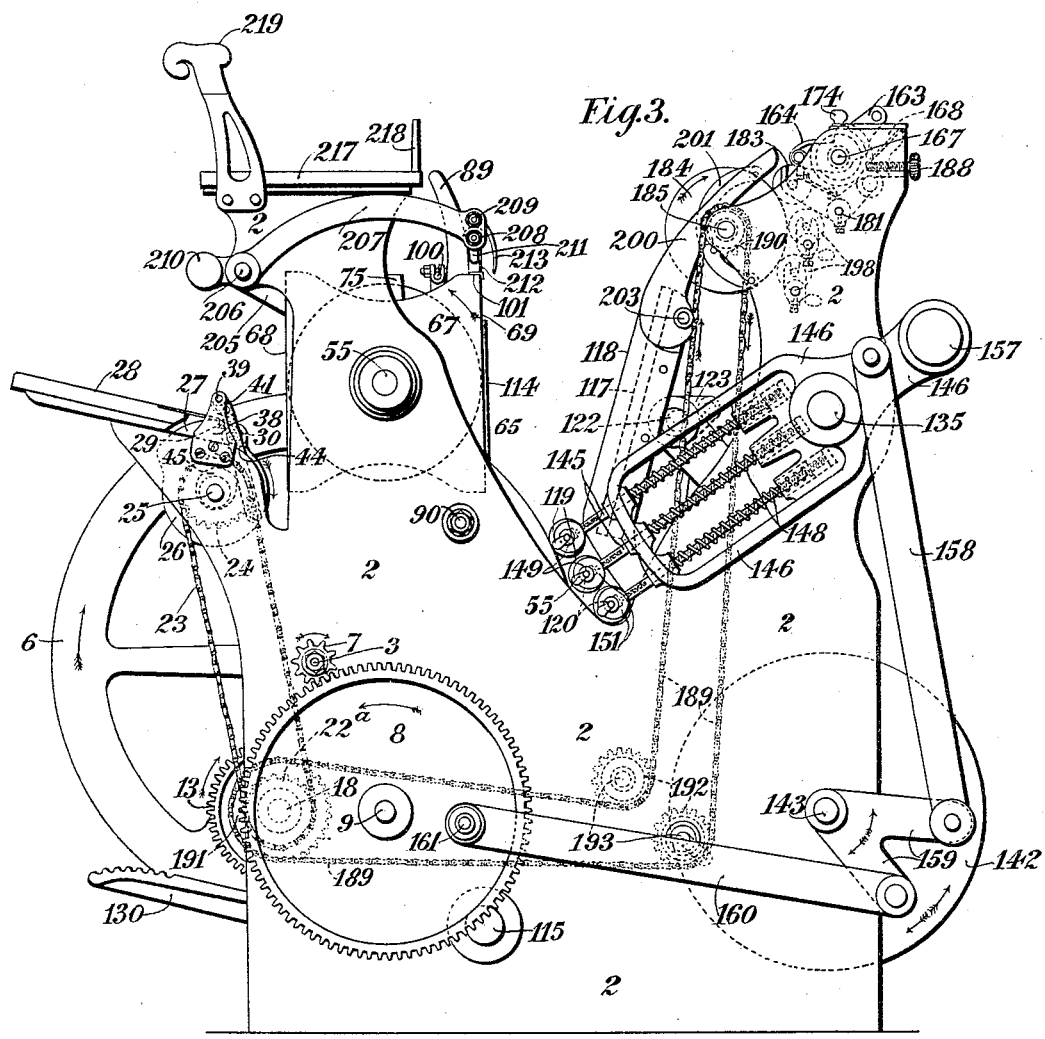
Figure 4:
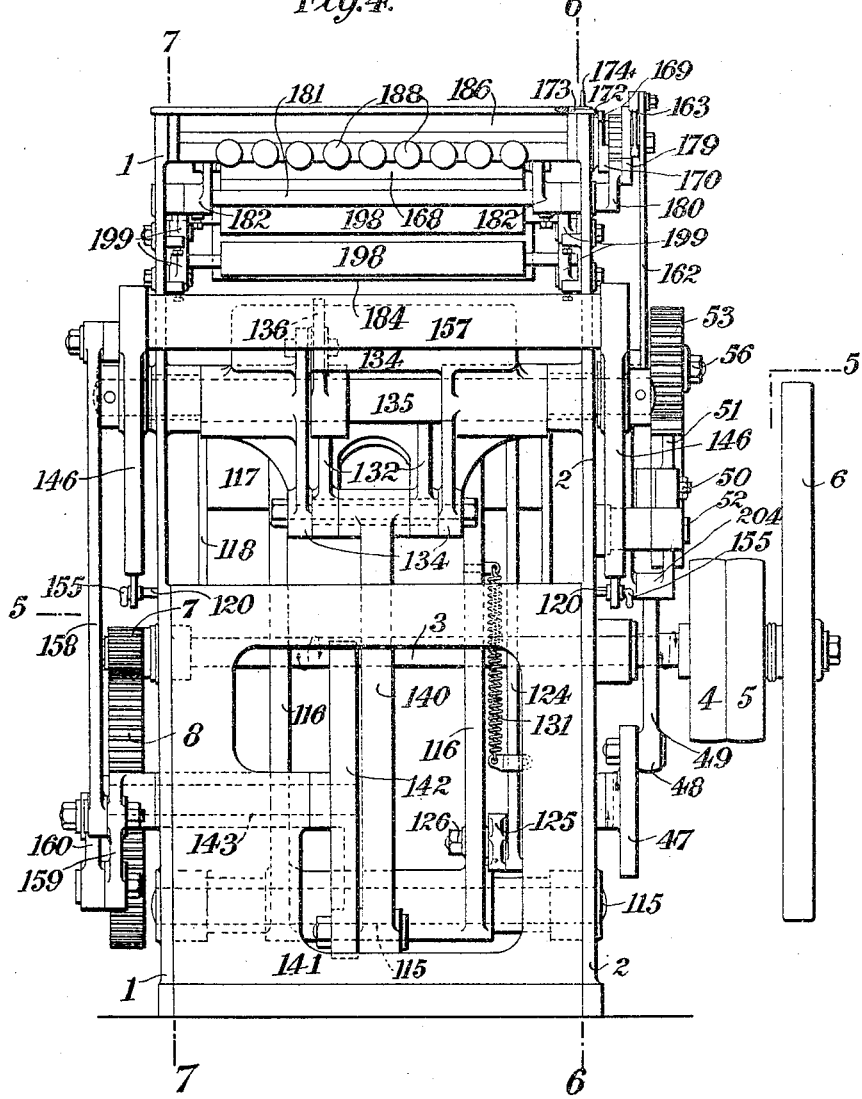
Figure 5:
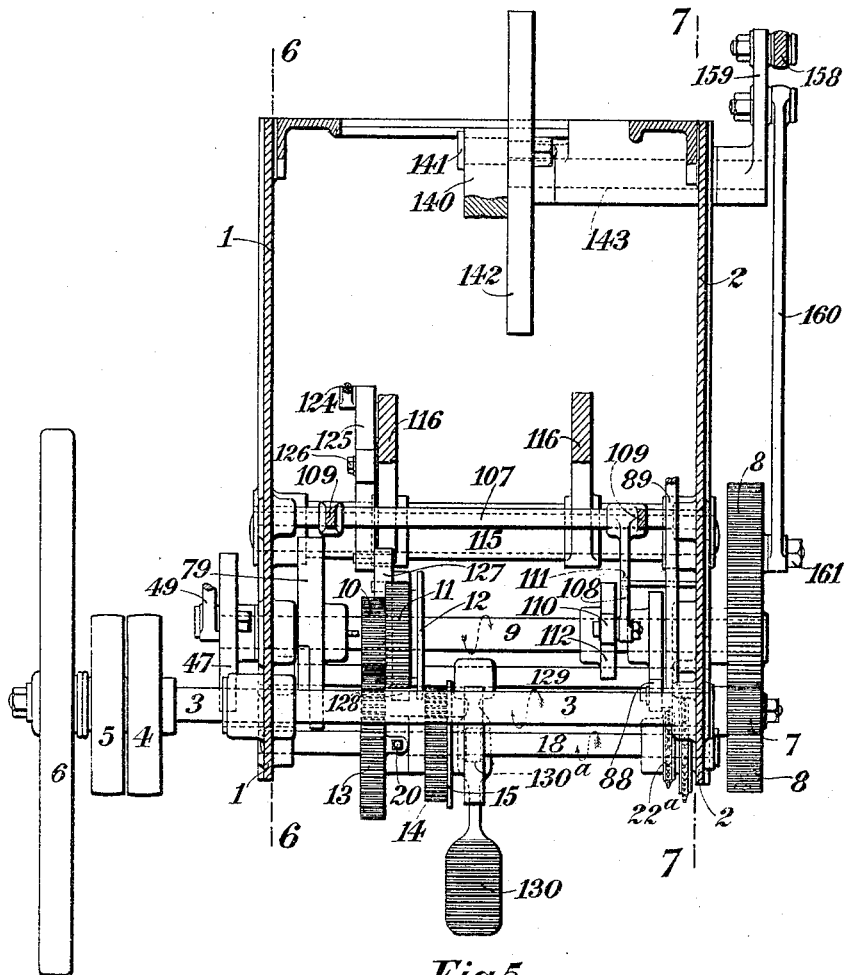
Figure 6:
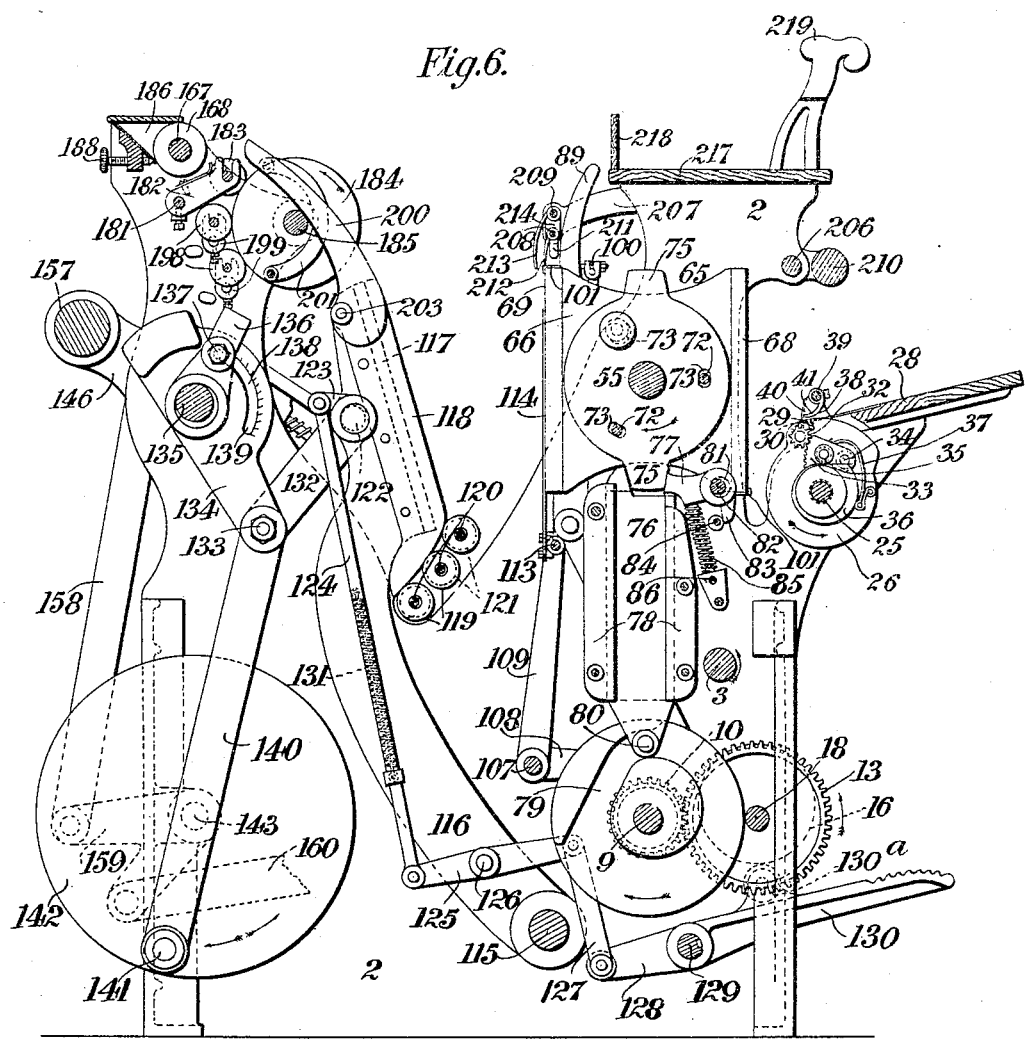
Figure 7:
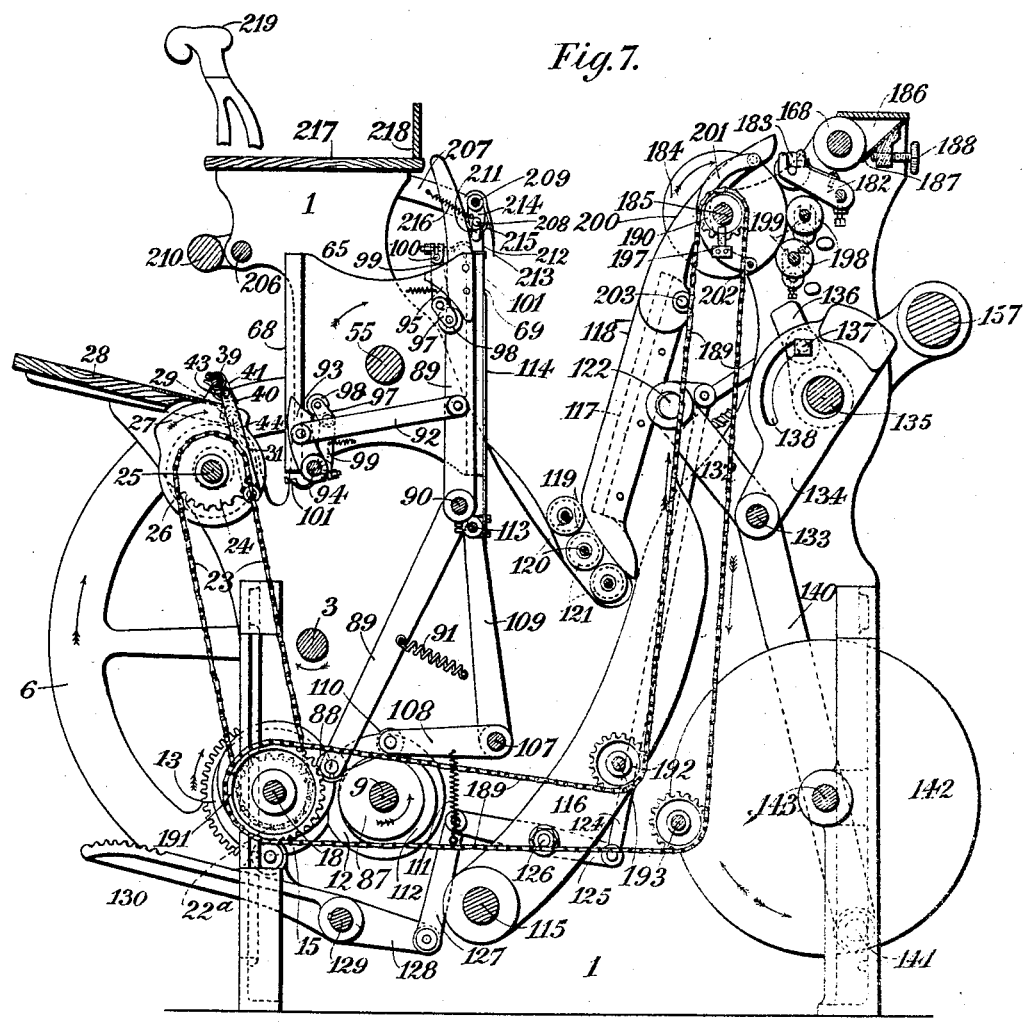
Figure 12:
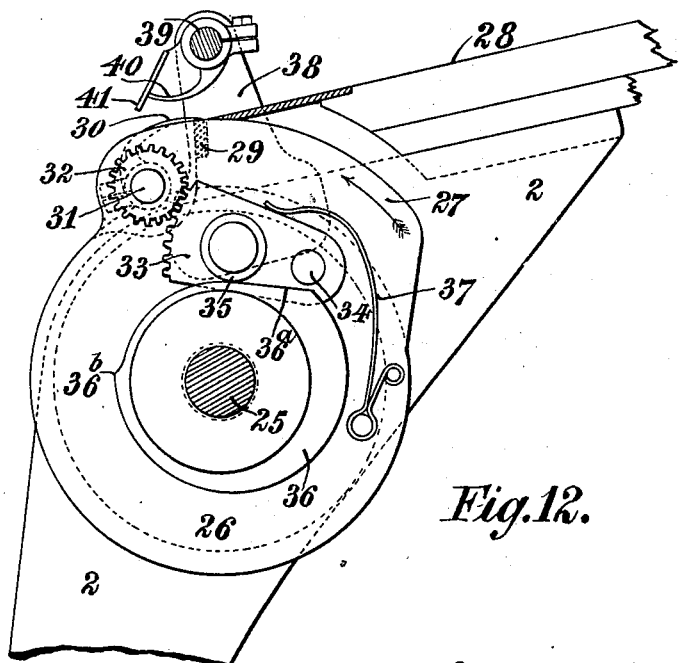
Figure 13:
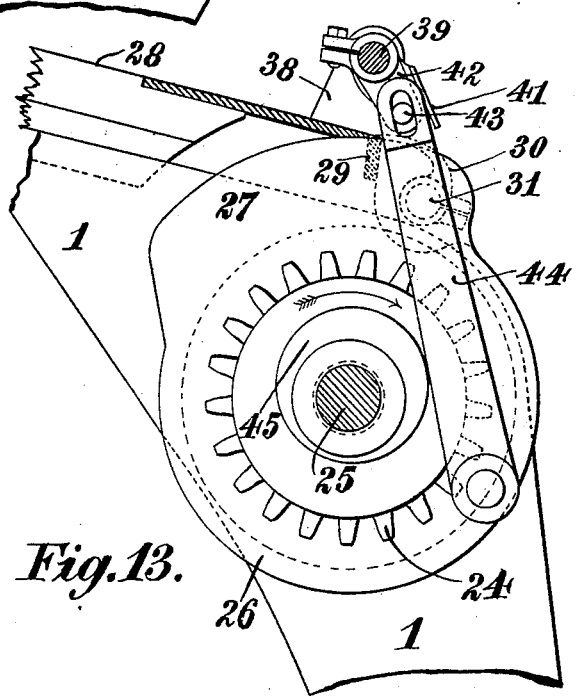
Figure 14:
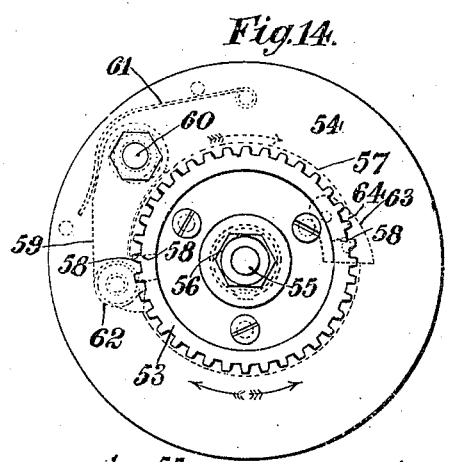
Figure 15:
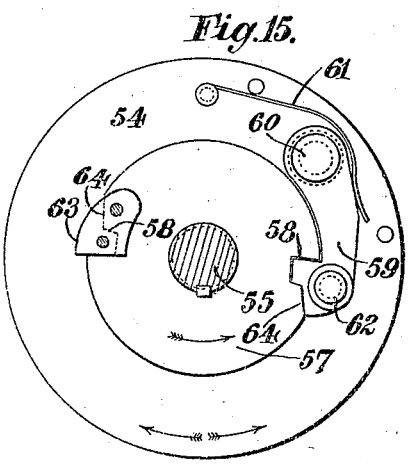
Figure 16:
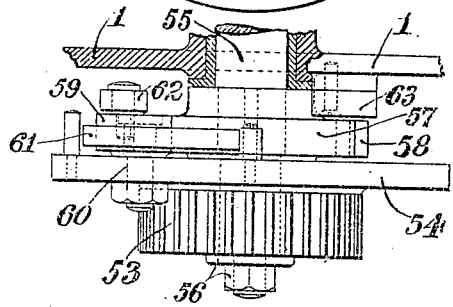
Figure 17:
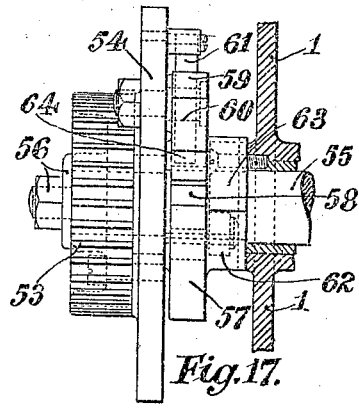
Figure 18:
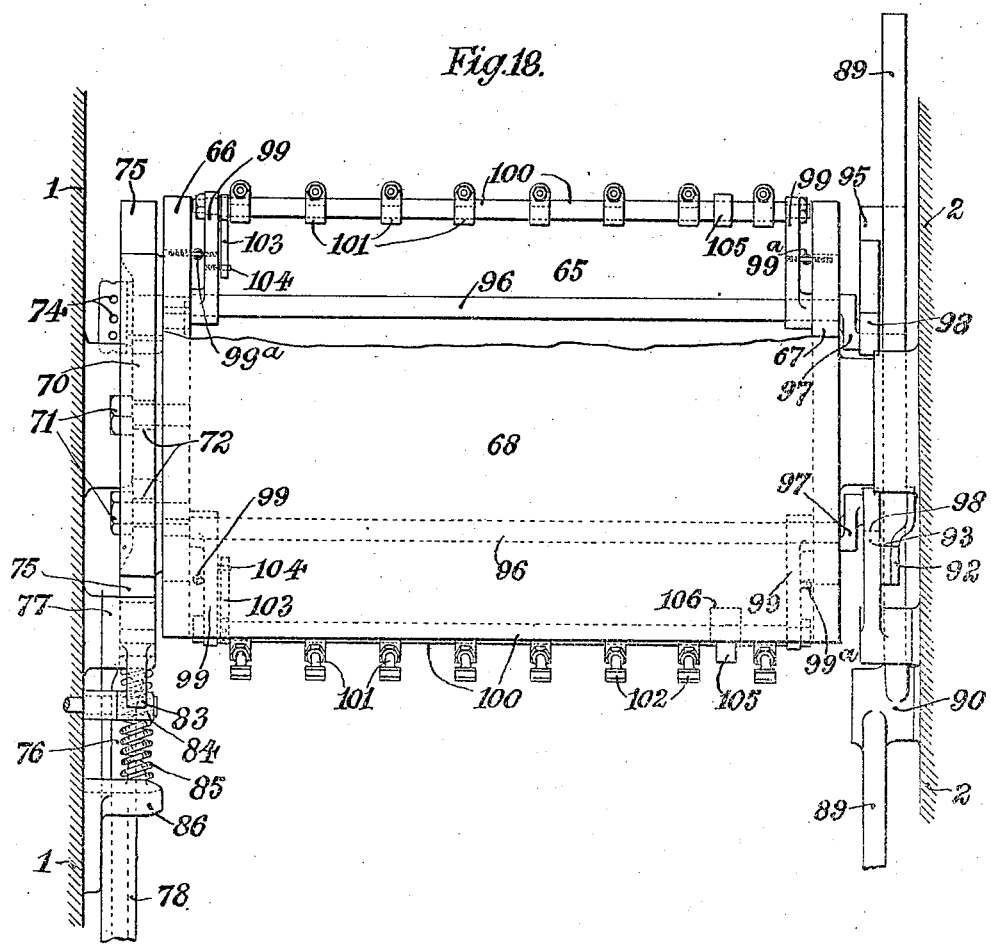
Figure 19:
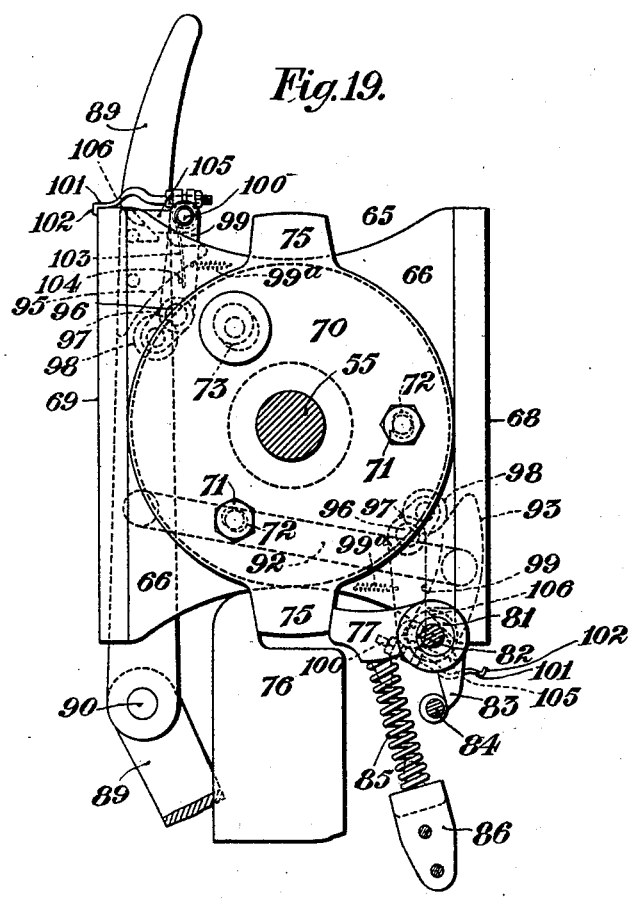
Figure 20:
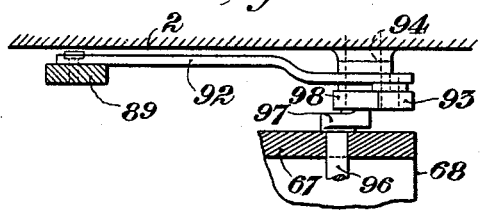
Figure 21:
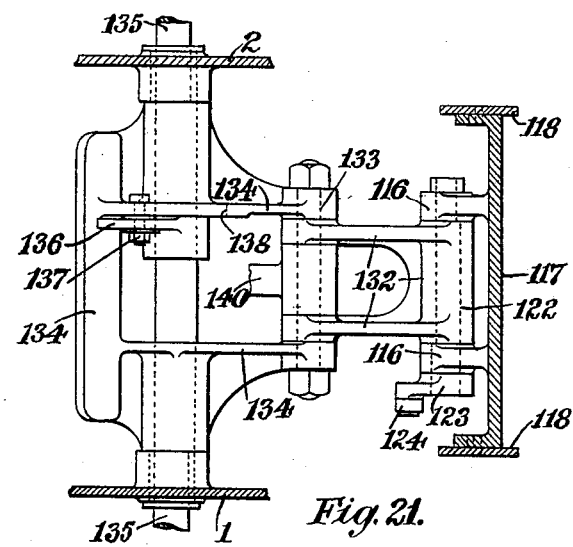
Figure 22:
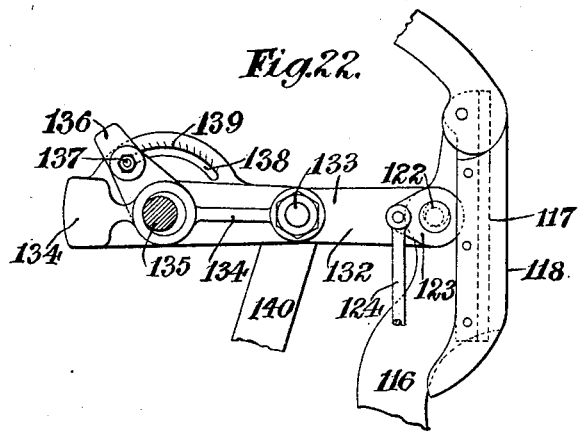
Figure 23:
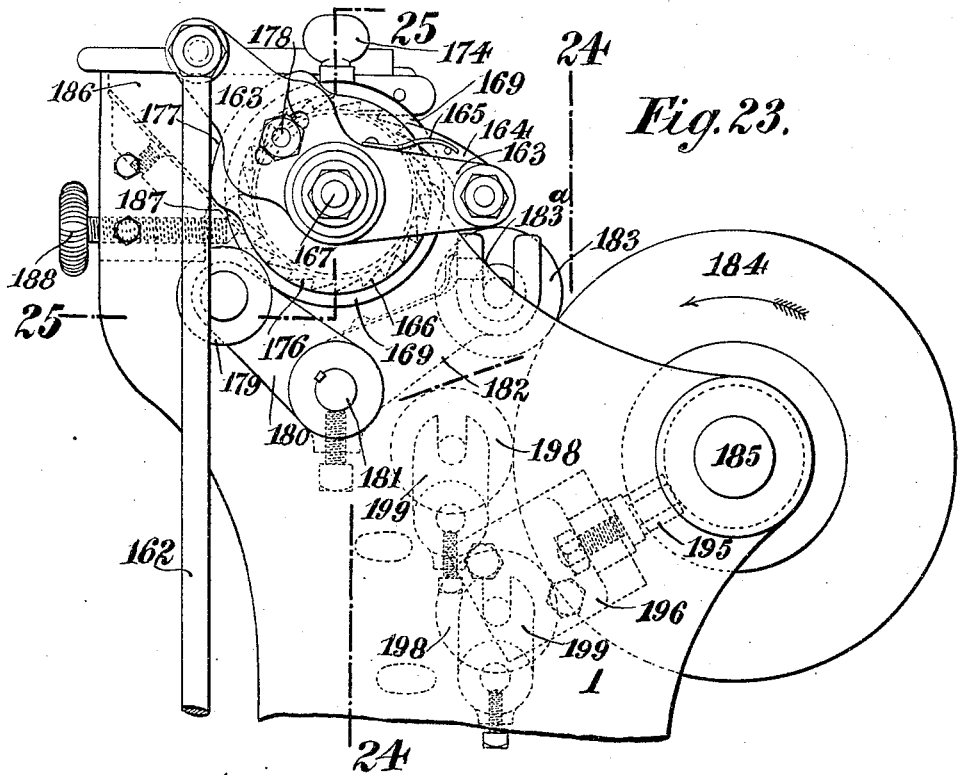
Figures 26, 27:
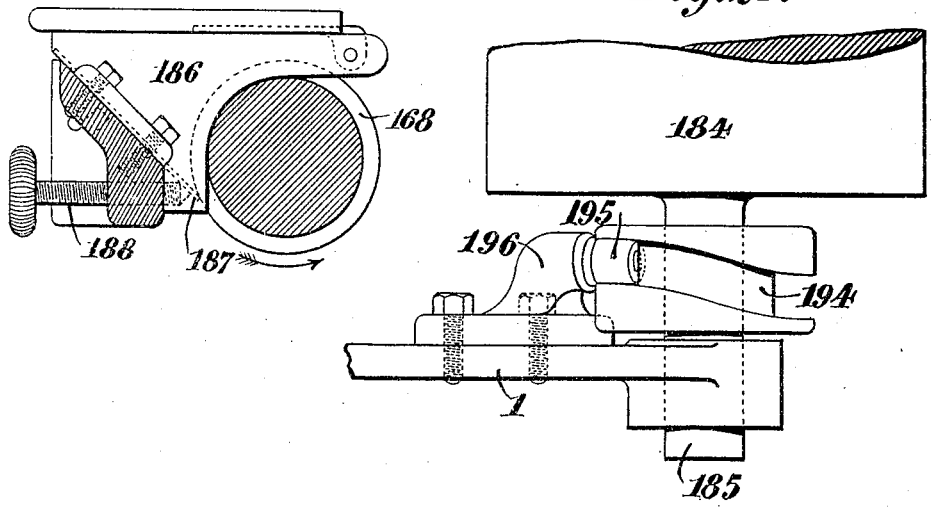
Figures 28, 29:
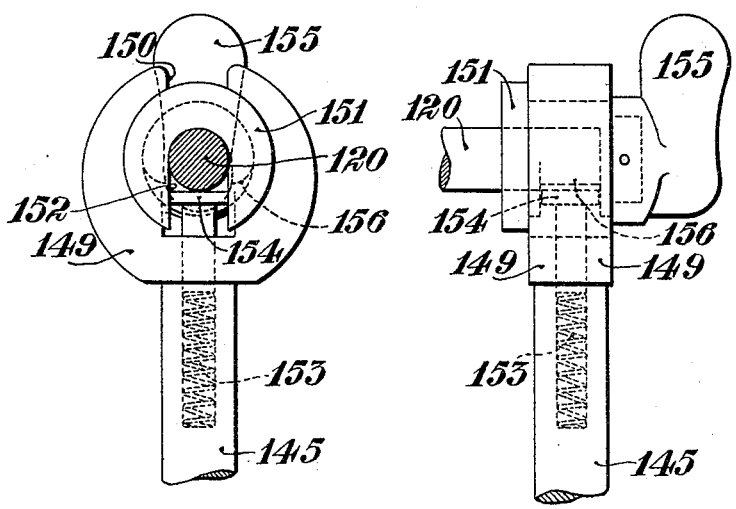
Figures 30, 31:
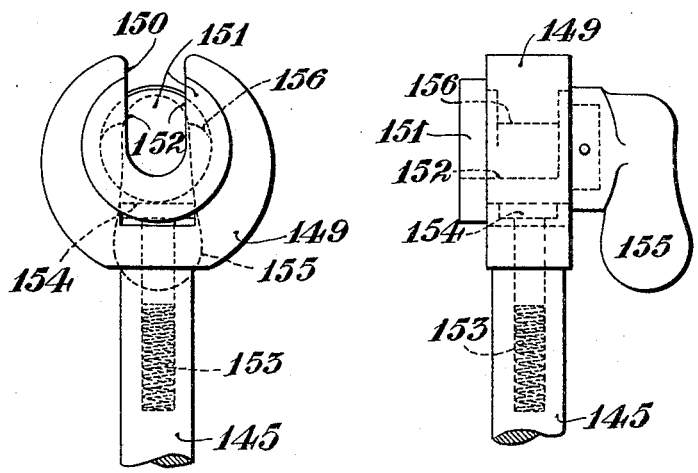
Figure 32:
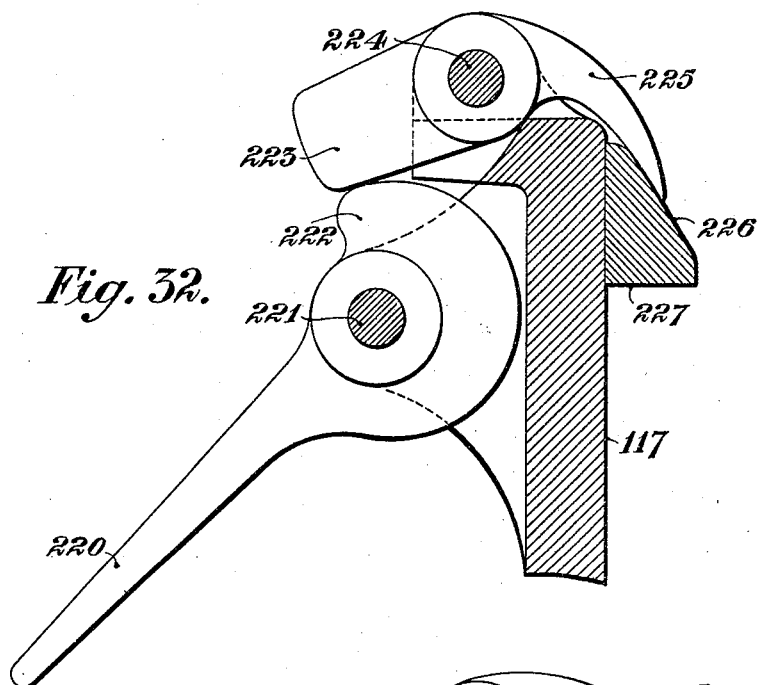
Figure 33:
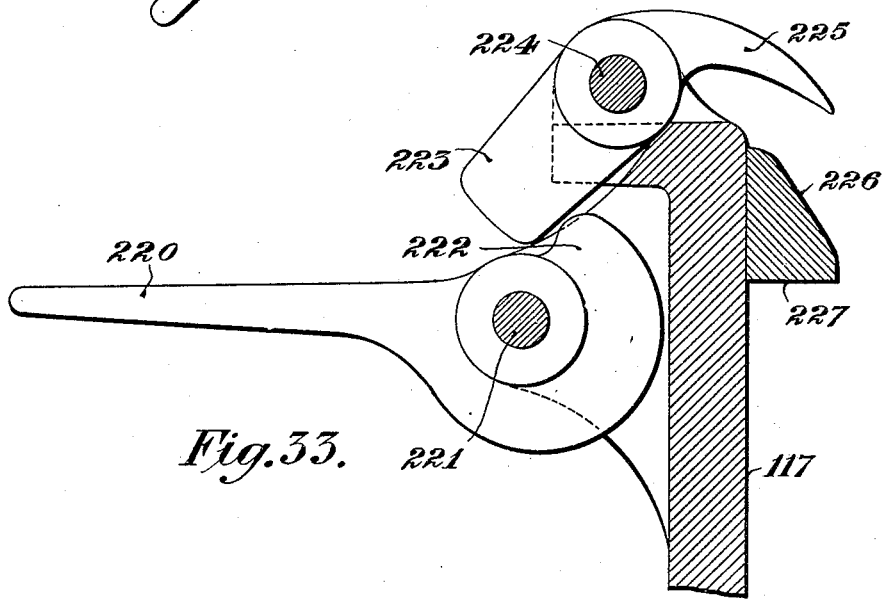
Figure 34:
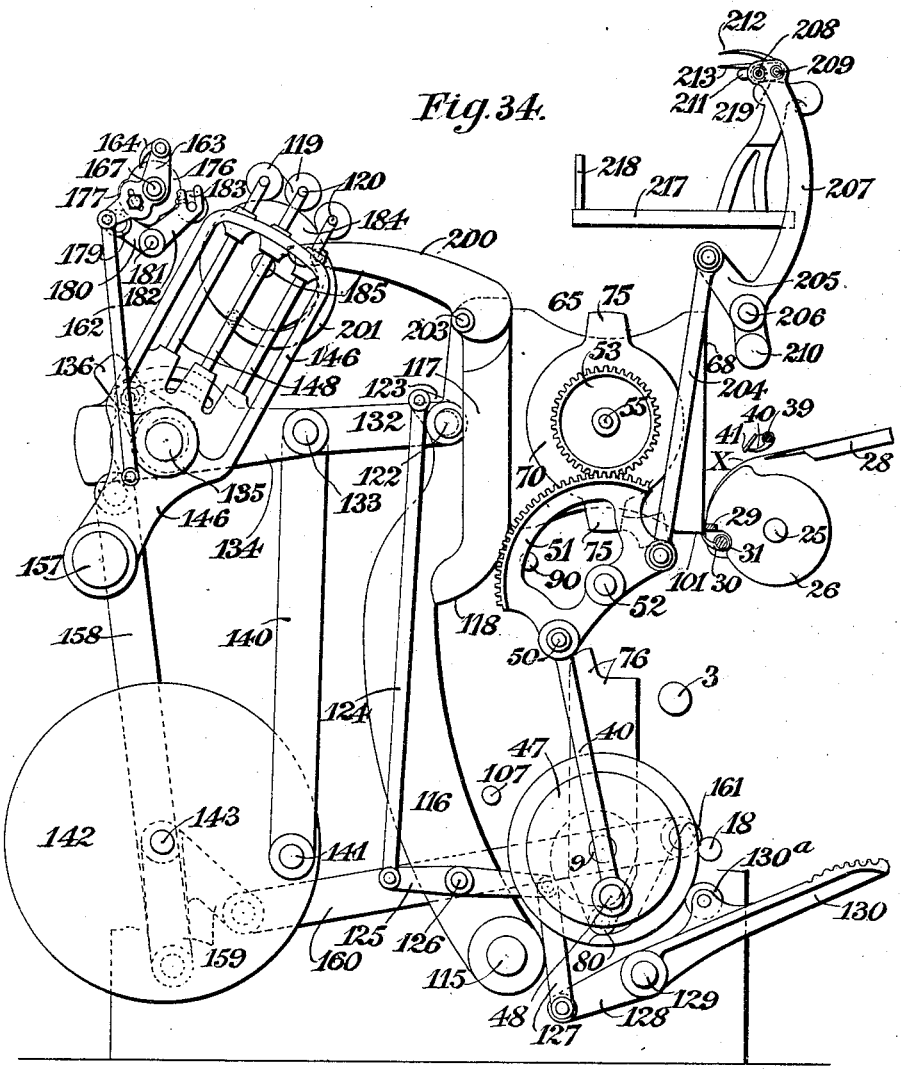

Figure 1 is a front elevation of one of the improved presses with the feed-board removed. Figs. 2 and 3 are elevations of respectively the left and right hand sides of the press. Fig. 4 is a rear elevation. Fig. 5 is a horizontal section on the crooked line 5 5 of Figs. 1 and 4 with the front of the frame removed. Fig. 6 is a longitudinal vertical section on the line 6 6 of Figs. 1, 4, and 5 looking from the left-hand side of the press. Fig. 7 is a longitudinal vertical section on the line 7 7 of Figs. 1, 4, and 5 looking from the right-hand side of the press. Fig. 8 is a side elevation of the change gearing for operating the feed and throw-off mechanism. Fig. 9 is a plan of Fig. 8. Fig. 10 is an elevation of a portion of the gearing shown in Figs. 8 and 9 for insuring proper register of the gearing. Fig. 11 is an elevation looking from the rear of the machine of the feed-drum mechanism. Figs. 12 and 13 are sections on respectively the lines 12 12 and 13 13 of Fig. 11 looking in the directions indicated by the arrows adjacent to those lines. Fig. 14 is an elevation looking from the left-hand side of the press, showing the mechanism for locking the platen-operating gear. Fig. 15 is a rear elevation of a part of the said mechanism. Fig. 16 is a plan, and Fig. 17 an elevation, of the right-hand side of Fig. 14. Fig. 18 is a front elevation of the platen, partly broken away, and its locking mechanism. Fig. 19 is an elevation of the left-hand end of Fig. 18. Fig. 20 is a horizontal section showing part of the mechanism illustrated in Figs. 18 and 19. Fig. 21 is a sectional plan, and Fig. 22 a side elevation, of the type or die bed and part of the operating mechanism therefor. Fig. 23 is a left-hand side elevation of the inking mechanism. Fig. 24 is a sectional elevation on the crooked line 24 24 of Fig. 23. Fig. 25 is a vertical section on the line 25 25 of Fig. 23. Fig. 26 is a transverse section on the line 26 26 of Fig. 24. Fig. 27 is a plan showing the mechanism for vibrating the ink-distributing cylinder. Figs. 28 and 29 are elevations taken at right angles to each other, showing the device for locking the riding rollers in their bearings. Figs. 30 and 31 are views, respectively, similar to Figs. 28 and 29, showing the device in its unlocked position. Figs. 32 and 33 are sectional elevations of the type or die locking device in its locked and unlocked positions, respectively; and Fig. 34 is a diagram illustrative of the operation of various parts of the press.

The detail drawings shown in Figs. 8 to 20 and 23 to 33, inclusive, are represented on a scale larger than that to which the other figures are drawn.

Throughout the several figures of the drawings similar characters of referencers are used to indicate similar parts of the apparatus.

In constructing a press according to this invention two side frames 1 2 are provided having bearings for carrying the various operating-shafts, of which latter the shaft 3 is that which is first operated from any suitable outside source of rotary motion through the medium of a fast pulley 4 (5 representing the loose pulley) or otherwise, as may be desired. The said shaft 3 has secured on it a fly-wheel 6 and a spur-pinion 7, the latter gearing with a spur-wheel 8, secured on a shaft 9, extending across the machine parallel with the driving-shaft 3. On the shaft 9, as shown most clearly in Figs. 8 and 9, are rigidly secured two spur-wheels 10 11 and a disk 12, the spur-wheels being arranged so that other spur-wheels, 13 and 14, may alternatively be brought into gear with them for varying the rate of output of the press. To the spur-wheels 13 and 14 are secured a disk 15 and a cam or eccentric 16, all of which are rigidly mounted on a sleeve 17, which is capable of being moved longitudinally along a shaft 18. The sleeve 17 is prevented from rotating independently of the shaft by a feather 19 and may be secured in either of its two positions of adjustment by a set-screw 20. The two spur-wheels 11 and 14 are of equal speed, and the wheels 10 and 13 are in the relation of one to two. The disks 12 and 15 are each formed with a substantially flat face 21, provided with a concave recess 22, the flat portions of which serve for preventing the relative timing of the various parts of the press being disturbed when the gearing 10, 11, 13, and 14 is being adjusted for varying the speed of operation or output.

On the shaft 18 is rigidly secured a sprocket-wheel 22$^a$, driving a chain 23, extending upward and engaging with a sprocket-wheel 24, secured on the shaft 25 of the feed-drum 26. This drum 26 (shown in detail in Figs. 11, 12, and 13) has a hump or projection 27 extending throughout its length, the surface of the hump being concentric with the shaft 25 and serving to support the blanks X, Fig. 34, while they are being transferred from the feed-board 28 to the platen.

At the rear side of the hump 27 a strip of india-rubber or equivalent material 29 is secured, and between this rubber and movable grippers 30 the blanks are gripped during their transfer from the feed-board to the platen. The grippers 30, of which there may be any desired number, are clamped on a shaft 31, journaled at or near its ends in the cheeks or end plates of the feed-drum 26. On one end of the shaft 31 is secured a spur-pinion 32, engaging with a toothed sector 33, pivoted on a stud 34, mounted in the adjacent end plate of the feed-drum 26. On this sector 33 is pivoted an antifriction-roller 35, which travels upon the periphery of a cam 36, rigidly secured to the side frame 1, and is held in constant contact with the cam by a blade-spring 37, secured to the end of the feed-drum 26. To the upper part of the frames 1 and 2 are secured brackets 38, supporting a shaft 39, carrying a number of smoothers 40 and stops 41 and a lever-arm 42, which is connected by a pin and slot 43 with the swinging end of a lever-arm 44, pivoted to the side frame 2. A cam 45, secured on the feed-drum shaft 25, acts upon the arm 44 to raise the smoothers 40 and stops 41, and a coiled spring 46 serves to lower the said smoothers and stops and constantly maintains the arm 44 in contact with the cam 45. The grippers 30, smoothers 40, and stops 41 are adjustable along their respective shafts 31 and 39 in the usual well-known manner.

On the left-hand end of the before-described shaft 9 is secured a crank-disk 47, the crank-pin 48 of which engages with the lower end of a link 49, whose upper end is pivoted on a pin 50, mounted in a toothed sector 51, which is pivoted at 52 to the adjacent side frame 1. This sector gears with a spur-wheel 53, secured to a disk 54, (see particularly Figs. 14, 15, 16, and 17,) loosely mounted on one end of the platen-shaft 55, the spur-wheel 53 and disk 54 being retained on the said shaft by a nut and washer 56.

Between the loose disk 54 and the adjacent side frame 1 a disk 57 is rigidly secured on the platen-shaft 55, this disk being provided with two diametrically opposite recesses 58 for receiving the end of a pawl 59, pivoted at 60 to the loose disk 54. On the back of the pawl 59 a blade-spring 61 bears so as to force the free end of the pawl into engagement with one or other of the recesses 58 when brought opposite to it. The pawl 59 also carries an antifriction-roller 62, adapted to engage with a cam 63, fixed to the side frame 1, the said cam serving to disengage the pawl 59 from the disk 57 against the pressure of the spring 61 when the disk 54 and platen-shaft 55 have been turned through half a revolution through the medium of the toothed gearing 51 and 53, at which juncture the pawl 59 is raised partially out of the recess 58 by the fixed cam 63, so that when the disk 54 starts on its return movement the pawl will ride up the incline 64 onto the periphery of the disk 57 and remain thereon until it is brought opposite to the then rearmost recess 58, into which it is forced by the spring 61, ready for turning the platen-shaft at the next rearward movement of the toothed sector 51.

The platen-frame 65 comprises two end plates 66 67, by which it is rigidly secured to the shaft 55, and two diametrically opposite platens 68 69. To the end plate 66 a disk 70 is secured by bolts 71, which pass through elongated slots 72, formed in the said disk. When these bolts are released, the disk 70 may be adjusted angularly in relation to the platen-frame by means of an eccentric 73, which engages with a suitable slot in the disk and which may be turned by means of a "tommy" inserted in the holes 74, Fig. 18, or in any other convenient manner. The disk 70 is formed with two diametrically opposite projecting stops 75, which are adapted to be engaged by locking devices 76 and 77, the former of which is capable of being raised and lowered in guides 78, fixed to the side frame 1 by a cam 79, secured on the before-mentioned shaft 9, acting on an antifriction-roller 80, mounted on the lower end of the said locking device or bolt 76. The locking device or latch 77 is pivoted on an eccentric 81, formed in part with a pin or stud 82, journaled in the side frame 1, in which it may be turned to any desired position for taking up the wear of the stops 75 and of the operating ends of the bolt 76 and latch 77. The latch 77 is provided with a stop-arm 83, adapted to engage with an eccentric 84, pivoted to the side frame 1, and the said eccentric is adjusted at the same time as the eccentric 81, so that the relative positions of the operative end of the latch 77 and the stops 75 may remain unaltered by such adjustment. The latch 77 is depressed by the stops 75 passing over it, and it is raised by a spring 85, supported on a bracket 86, secured to the side frame 1, immediately the said stops pass over the end of the latch, the eccentric 84 and arm 83 serving to limit the upward movement of the latch.

On the shaft 9 is secured a cam 87, which engages with an antifriction-roller 88 on the lower end of a lever 89, pivoted at 90 to the side frame 2, the roller 88 being held constantly in contact with the cam 87 by a spring 91. To the upper end of the lever 89 is pivoted one end of a link 92, whose opposite end is pivoted to a cam 93, itself pivoted at 94 to the adjacent side frame 2, another cam, 95, being rigidly secured to the lever 89 above the link 92. Near two diagonally opposite corners of the platen end plates 66 and 67 are journaled two shafts 96, which are identical in construction and operation, so that the following description of one will suffice for both. Each of the shafts 96 at the right-hand side of the press projects through the end plate 67, at the outside of which it is provided with a crank-arm 97, carrying an antifriction-roller 98, adapted during the rotation of the platen-frame to engage with the before-described cams 93 and 95. Closely adjacent to the inner side of the platen end plates 66 67 two arms 99 are rigidly secured to the shaft 96, and loosely journaled in the outer ends of these arms 99 is a shaft 100, on which are adjustably clamped a number of grippers 101, having their outer ends hooked or bent at right angles, as at 102. Springs 99$^a$, secured to the plates 66 67 and arms 99, are provided for returning the arms 99 to their normal position after they have been deflected by the cams 93 95. The hooked or bent ends 102 extend over one edge of the adjacent platen and are adapted to grip the paper against the face of the said platen, and they are held down upon the said edge by a blade-spring 103, secured to the shaft 100 and bearing against a pin 104, fixed in the adjacent arm 99, as shown most clearly in Figs. 18 and 19. On each of the shafts 100 is secured a lever-arm 105, whose outer end is inclined and caused to operate conjointly with a similarly-inclined lug or projection 106 (shown in dotted lines in Figs. 18 and 19) to turn the shaft 100 against the influence of the spring 103, so as to move the grippers 101 out of contact with the edge of the platen.

107 is a horizontal shaft extending across the lower part of the press and having secured thereon an arm 108, formed in part, if desired, with an upwardly-extending arm 109 and carrying at its free end an antifriction-roller 110, which under the influence of a spring 111 is held constantly in contact with an edge cam 112, secured on the before-described shaft 9. Another arm 109, similar to the arm 109 above mentioned, is secured to near the left-hand end of the shaft 107, and to the upper ends of these two arms 109 is secured a horizontal rod 113, on which are adjustably secured any desired number of tympan-fingers 114, adapted to be swung by the before-mentioned spring 111 against the face of each platen when it is presented toward the rear of the machine, as shown in Fig. 7.

Near the lower part of the side frames 1 2 is supported a transverse shaft 115, on which are pivoted the lower ends of two levers 116, to whose upper ends is rigidly secured the type or die bed 117, the raised edges or side frames 118 of which constitute rails or runners for the rollers 119, secured on the spindles 120 of the usual "compo" riding rollers 121. The type or dies are secured on the bed 117 by the locking device hereinafter described, and illustrated in Figs. 32 and 33. Near the upper ends of the levers 116 are provided bearings for receiving a shaft 122, (see particularly Figs. 21 and 22,) on one end of which is secured a crank-arm 123, connected by a rod or link 124 to the rear end of a lever 125. This lever 125 is pivoted at 126 to the adjacent lever 116 and at its forward end is connected by a link 127 to a lever-arm 128, secured to a transverse shaft 129, on which is also secured a treadle 130. A spring 131 is attached to the connecting-rod 124 and to the adjacent lever 116 and serves to raise the treadle 130 after it has been depressed by the operator, as hereinafter described.

The portions of the shaft 122 journaled in the levers 116, are eccentric to the portion between the said levers 116, and on this central portion is pivoted the front end of a toggle-link 132, whose rear end is pivoted on a rod or shaft 133, on which is also pivoted the forward end of a counterweighted toggle link or frame 134. The toggle-frame 134 is adjustably secured on the central part of a shaft 135, whose outer portions are journaled eccentrically to the central part in the side frames 1 and 2. The shaft 135 has rigidly secured to it an arm 136, which by a clamping-bolt and nut 137, adjustable along an arcual slot 138 in the toggle-frame 134, enables the said frame to be adjusted forward or backward to set the throw of the type or die bed 117. Adjacent to the arcual slot 138 is a graduated scale 139 for indicating the position the toggle-frame 134 should occupy in relation to the eccentric-shaft 135 for given thicknesses of paper and according to the required body of ink to be deposited on the paper.

On the central part of the shaft 133 is pivoted the upper end of a link 140, whose lower end is pivoted on a crank-pin 141, carried in a crank-disk 142, secured on a rocking shaft 143, extending about half-way across the rear of the press, as shown in Figs. 4 and 5.

The spindles 120 of the riding rollers 121 are mounted in bearings, (shown in detail in Figs. 28 to 31, inclusive,) there being three, as shown in Figs. 2, 3, 6, and 7, or any other desired number of the rollers 121, according to requirements. Each of these bearings is formed in the front end of a rod 145, which is capable of sliding in the direction of its length in one of the two frames 146, loosely pivoted on the ends of the before-described eccentric-shaft 135. Each rod 145 is provided with a collar or enlargement 147, against which bears one end of a helical spring 148, whose opposite end bears against the inner side of the frame 146, so as to tend always to hold the before-described rollers 119 onto the rails 118.

At its outer end each of the rods 145 is provided with a disk or head 149, having a recess 150, which at one part is enlarged to accommodate a revoluble bush 151, which is also recessed, as at 152, for receiving the end of the spindle 120. The width of the recesses 150 152 corresponds with the diameter of the spindles 120. Each of the rods 145 is bored out for receiving a helical spring 153 and the stem of a table 154, which latter is adapted to form the bottom of the bearing when the spindle is locked in its operative position. On the outer end of each of the bushes 151 is secured a handle 155, by which it may be turned in the head 149 for releasing or securing the spindle 120. When a riding roller has to be inserted in its bearings, the bushes of the bearings therefor are turned into the position indicated in Figs. 30 and 31, wherein the mouth of the recess 152 is presented outward and free for receiving the spindle. After the spindle has been inserted in position the bush 151 is turned through half a revolution, so as to cause the recess 152 to face inward, as shown in Figs. 28 and 29, and thereby lock the spindle in position, the said spindle being then supported between the spring-pressed table 154 and the bush 151. When the bush is turned to again present the mouth of the recess outward and release the spindle 120, the table 154 is depressed by a cam-surface 156, formed on the outside of the said bush.

If desired, any roller-retaining bearing other than that last described and shown in Figs. 28 to 31 may be employed, the said described device constituting no part of my present invention and being given merely as a convenient illustration of one way of attaining the desired result.

The two swinging frames 146 at opposite sides of the press are connected together by a bar 157, which also serves as a counterweight, and to one of the said frames 146—viz., the right-hand one—is pivoted the upper end of a link 158, whose lower end is pivoted to one arm of a bell-crank lever 159, rigidly secured on the before-mentioned rocking shaft 143. The other arm of the bell-crank lever 159 is connected by a link 160 to a crank-pin 161, secured in the before-described spur-wheel 8.

To the left-hand swinging frame 146 is pivoted the lower end of a link 162, whose upper end is pivoted to one end of a lever 163, carrying at its opposite end a pawl 164, acted on by a blade-spring 165. This spring 165 tends always to hold the pawl 164 in engagement with a ratchet-wheel 166, fixed on the spindle 167 of the ink-drum 168, which is mounted in bearings in the two side frames 1 and 2.

Between the ratchet-wheel 166 and the adjacent side frame 1, as shown most clearly in Fig. 25, a disk 169 is provided, having a rib 170 extending about half round it and projecting laterally into the plane in which the inner part or nose of the pawl 164 is oscillated. The disk is capable of being adjusted angularly upon the shaft 167, so that the rib 170 may be caused to extend more or less into the path of the operative end of the pawl 164, and thereby, while the said pawl is always operated through the same angle, regulate the extent of angular motion to be imparted to the ink-drum 168 at each complete oscillation of the pawl. Assuming, for example, that at each complete oscillation the pawl 164, if left unrestricted can move the ratchet-wheel 166 to the extent of, say, six teeth of the said wheel, by adjusting the disk 169 the pawl may be caused to ride over the rib 170 to an extent corresponding to any less number of teeth—say three—and allow the pawl to move the ratchet-wheel to the extent of the other three or remaining number of teeth, whereby the ink-feed may be varied to any desired extent. For securing the disk 169 in any of its adjusted positions a circumferential groove 171 of taper form in cross-section is provided for receiving the lip or rib 172 of a clamping-plate 173, capable of being raised and lowered by a thumb-screw 174, screwed into the side frame 1. The clamping-plate 173 is guided in its vertical movement by a steadying-pin 175, fixed in the plate 173 and loosely engaging with a hole or recess in the side frame 1. After turning the screw 174 so as to raise the clamping-plate 173 out of engagement with the disk 169 the latter may be adjusted as before mentioned, and by lowering the screw the lip 172 may be jammed into the groove to retain the disk 169 in position.

Between the ratchet-wheel 166 and the pawl-lever 163 a cam-disk 176 is provided, whose cam or operative face 177 extends through about forty-five degrees. This cam-disk 176 is adjustably secured—as, for example, by the bolt-and-slot connection 178—to the pawl-lever 163, and at each oscillation of the disk 176 the cam 177 thereof acts on an antifriction-roller 179, carried on the arm 180, and through the shaft 181 and arms 182 moves the ductor-roller 183 into contact with the ink-drum 168, holding it thereagainst until the cam 177 leaves the antifriction-roller 179, at which juncture the ductor-roller 183 by gravity falls into contact with the ink-cylinder 184, in which position it remains until the cam 177 again raises it into contact with the ink-drum 168. The spindle of the ductor-roller 183 is supported in open bearings in the before-described arms 182 and is retained therein by spring-pressed studs 183$^a$, which readily yield when the said ductor-roller is inserted into or removed from the arms 182.

The back of the ink-trough 186 is constituted by a flexible blade or plate 187, capable, by screws 188, of being adjusted to bear with more or less pressure against the ink-drum 168, and thereby vary the thickness of the film of ink carried out of the trough 186 on the surface of the said drum.

The ink-cylinder 184 is continuously rotated through a chain or equivalent 189, which is in engagement with a sprocket-wheel 190, "feathered" to the shaft 185 of the said cylinder, and with another sprocket-wheel 191, rigidly secured on the before-described shaft 18, the chain at intermediate parts being guided by idle wheels 192, pivoted on studs 193, fixed (one adjustably) to the side frame 2. The ink-cylinder 184 has endwise reciprocating motion imparted to it by any of the usual well-known means—such, for example, as a barrel-cam 194, secured on the shaft 185, engaging with an antifriction-roller 195, revoluble on a bracket 196, secured to the side frame 1, as shown in Fig. 27. The before-described sprocket-wheel 190 is prevented from participating in the endwise movement of the ink-cylinder 184 by any suitable devices, such as brackets or fingers 197, Fig. 7, which may be secured to the side frame 2 and engage with the opposite faces of the said wheel.

198 represents two compo ink-distributing rollers, which in the usual well-known manner rotate in contact with the ink-cylinder 184 and the spindles of which are supported in adjustable forked bearings 199.

To the upper part of the type or die bed 117 are pivoted two curved horns 200, which form extensions of the track-rails 118 and are connected to the adjacent side frames 1 2 by bent links 201, pivoted to the said frames at 202, the said horns being pivoted at 203 to the bed 117. These horns 200 serve to support the riding rollers 119 during that period of their travel at which they are passing from the type-face toward the ink-cylinder 184, and vice versa, the said horns at that time having assumed a substantially horizontal position, as represented in Fig. 34, owing to the forward motion of the bed 117 and the conjoint action of the links 201.

To the forward part of the before-described toothed sector 51 is pivoted the lower end of a link 204, whose upper end is similarly pivoted to an arm 205, rigidly secured to a shaft 206, extending across the upper part of the press and suitably journaled in the side frames 1 and 2. To this shaft 206 are secured two arms 207, (one of which, as shown in Fig. 2, may be integral with the arm 205,) carrying at their free ends two rods or shafts 208 209 and counterweighted by a bar 210. The rod or shaft 208 is cranked at one end, as at 211, and may be fixed in the ends of the arms 207 and carries gripper-fingers 212, which may be adjusted along it to any desired position. The rod or shaft 209 has adjustably secured on it gripper-fingers 213 and is revoluble in the arms 207 and at one end has secured on it a lever-arm 214, carrying at its free end an antifriction-roller 215. A spring 216, Fig. 7, is provided which constantly tends to draw the fingers 213 onto or toward the fingers 212, so as at the proper times to grip the paper between the said fingers.

On the top of the frames 1 and 2 is secured a delivery-board 217, having a stop-board 218, and at one side of the delivery-board is provided a fixed cam 219, bolted to the side frame 2, against which the before-mentioned antifriction-roller 215 abuts at the end of the upward swing of the arms 207 to open or raise the gripper-fingers 213, and thereby release the printed sheets, which then fall onto the delivery-board 217.

The before-mentioned type or die locking device, as shown in Figs. 32 and 33, consists of a hand-lever 220, pivoted on a stud 221 to the back of the bed 117 and terminating at one end in a cam 222, the hand-lever 220 being so weighted or spring-controlled that it will always have a tendency to assume its locking position. The cam 222 bears against the under side of a weighted arm 223, secured on a rod or shaft 224, carrying locking-catches 225, which are adapted to engage with an inclined face 226 on the outside of the chase 227, there being any desired number of catches, according to the width of the type or die bed 117. When the hand-lever 220 is raised, as shown in Fig. 33, the arm or weight 223 descends and raises the catches 225 off the chase. When, on the contrary, the lever 220 is depressed, the catches are also depressed and by bearing on the inclined face 226 hold the chase rigidly in position on the bed 117.

As a convenient point from which to describe the operation of the before-described press let it be assumed that the press is in the position in which it is shown in Figs. 1 to 7, inclusive. The operation may then be described as follows: The operator feeds a blank sheet of paper X down the feed-board 28 until it is arrested by the then-depressed stops 41 and smoothers 40, which allow the forward edge of the said blank to project slightly beyond the forward edge of the feed-board. The feed-drum 26, then in about the position indicated in Fig. 34, with the grippers 30 wide open, in its further rotation in the direction indicated by the arrow brings the india-rubber strip 29 beneath the forward-projecting edge of the blank X, and at that instant the grippers 30, which by the roller 35 traveling over the inclined part 36ª of the fixed cam 36 (see Fig. 12) have been quickly closing, descend onto the edge of the paper and grip it between themselves and the strip 29. Simultaneously with the gripping of the blank by the grippers 30 the stops 41 and smoothers 40 are raised through the rocking shaft 39, which is turned in its bearings by means of the rotating cam 45 acting on the lever-arm 44 in slotted connection with the arm 42, secured on the said rocking shaft 39. (See Fig. 13.) When the feed-drum assumes the position in which it is indicated in Fig. 34, the front edge of the paper blank X rests on the adjacent platen-grippers 101, which are then in their open position and which immediately after this operation are allowed to close under the influence of the springs 99ª and 103, the cam 87 then having assumed a position allowing of the forward movement of the upper end of the lever 89 and of the cam 93. The drum-grippers 30 release the blank simultaneously with the seizure of the blank by the platen-grippers 101, this being effected through the action of the hump 36ᵇ, Fig. 12, of the fixed cam 36 on the toothed sector 33 and pinion 32. At this juncture the cam 79 disengages the locking-bolt 76 from the stop 75 on the platen-shaft 55, and through the crank 48, link 49, toothed sector 51, pinion 53, disk 54, pawl 59, and disk 57 the platen is turned until it has moved through one hundred and eighty degrees, when it is stopped by the then elevated locking-bolt 76, as shown in Fig. 6, the latch 77 springing up behind the stop 75 to prevent any rebound or reflex action of the platen, which is thereby rigidly locked in the printing position. During this partial rotation of the platens the arms 207 are raised so that the gripper-roller 215 is brought into contact with the stationary cam 219, whereby the gripper-fingers 213 are moved away from the fingers 212. The tympan-fingers 114 are then swung against the blank by the spring 111, the cam 112 having been turned into the position admitting of the said movement of the tympan-fingers.

During the foregoing series of operations the crank 161, link 160, and bell-crank lever 159 rock the shaft 143 in one direction through ninety degrees and through the disk 142, crank 141, link 140, and toggle-links 132 and 134 move the type or die bed 117 forward toward the platen to effect the printing of the sheet, the riding rollers 121 having been simultaneously moved over the type by means of the frames 146 and link 158. At this period the bell-crank lever 159, as shown in Fig. 34, is at its lowest position and commences to ascend and through the link 158 swings the frames 146 downward and carries the riding rollers 121 off the ink-drum 184 and over the type, the disks 119 on the riding-roller spindles 120 during this movement traveling successively over the rails 200 and 118. The type or die bed 117 is at the same time being moved backward through the lowering of the link 140 by the crank 141 and through the action of said link on the shaft 133 connecting the toggle-links 132 134. The arms 207 are also raised into an almost vertical position.

The foregoing operations all take place during one-half rotation of the shaft 9 and spur-wheel 8 and the corresponding downward movement of the bell-crank lever 159 and the platen-rotating movement of the toothed sector 51, the result being that a blank sheet has been fed into the press and printed. During the next half rotation of the shaft 9 the toothed sector 51 makes its return movement, when the spur-wheel 53 is unlocked from the platen-shaft 55, and the platen thereby remains stationary, this being effected by the pawl-roller 62 being in contact with the stationary cam 63, and thereby released from the recess 58 of the disk 57, with which it was last engaged, to rotate the platen and bring the blank sheet to the printing position. The return movement of the sector 51, (when the spur-wheel 53 is idle,) through the link 204 and arms 207, lowers the delivery-grippers 212 213, ready to grip the printed sheet, which latter operation is next effected by the movement of the lever 89, against the upper end of which bears the roller 215, carried on or in operative connection with the gripper-shaft 209, the sheet then being ready for delivery by the grippers 212 213 at the next semirotation of the platen. This movement of the lever 89 also effects the release of the then upper platen-grippers 101.

Should the operator miss feeding a blank to either of the platens, he may prevent an impression on the blanket by depressing the treadle 130, which through the links and levers 128, 127, 125, 124, and 123 turns the eccentric shaft 122 so as to move the bed 117 backward—that is to say, farther away from the platen—and thereby prevent it reaching the platen when at the end of its forward stroke.

When a heavy form is in use and it is desired to apply a proportionately heavier coating of ink thereto, the spur-wheels 13 and 14 are moved along their shaft 18, so as to disengage the wheel 14 from the wheel 11 (the equal gear) and make engagement between the two-to-one gear 13 10 and at the same time move the cam 16 over the antifriction-roller 130ª of the treadle 130. By these means the feed-drum 26 is caused to rotate once to each complete rotation of the platen, (instead of twice, as when the wheels 11 and 14 are in gear,) and thereby supply a blank sheet to only alternate platen-faces, the cam 16 by then acting on the roller 130ª through the various before-mentioned devices 128, 127, 125, 124, 123, and 122 preventing the type or die faces reaching the platen-blanket, and the riding rollers consequently are twice passed upward and downward over the form for each impression. The change of gear as just described also causes the ink-drum 184 to be rotated slower, and thereby allows the riding rollers to take more ink therefrom.

To adjust the press to suit varying thicknesses of paper or material to be printed on or the depth of impression to be made, the nut 137 is released, and the arm 136 is turned so as to partially rotate the shaft 135, and thereby by the eccentricity of this shaft move the fixed pivot of the toggle-frame 134 (constituted by the shaft 135) nearer to or farther from the platen-shaft 55, the nut 137 being afterward tightened when the desired adjustment has been effected.

When it is required to adjust the platen 65 angularly on its shaft 55, so that the platen faces may bear evenly upon the form, the bolts 71 are released and the eccentric 73 turned so as to move the platen in relation to the locking-disk 70 to the required extent, the disk 70 being at that time secured against rotation by one of its stops 75 being engaged between the bolt 76 and catch 77. The bolts 71 are then tightened to secure the platen 68 and disk 70 in their relatively adjusted positions.

The foregoing description has been restricted to the apparatus as adapted for printing purposes; but it will readily be understood that by substituting a die or dies for the printing-form and dispensing with the ink-distributing mechanism the said apparatus may be employed for stamping or embossing paper, thin sheet metal, or other material.

I claim—

1. In a platen-press the combination with a platen-body and a shaft therefor rotatable in the fixed frame and a plurality of platens on the platen-body of a notched disk fixed on the shaft, a pawl capable of engaging with the disk, means in operative connection with the pawl for rocking it about the shaft, a stationary cam in the path of the pawl and inclines on the disk for disengaging the pawl from the disk, substantially as set forth.

2. In a platen-press the combination with a rotatable platen-body of a rocking shaft journaled in the platen-body, arms fixed on the shaft, a gripper-shaft journaled in the arms, grippers adjustable on the gripper-shaft, a spring in operative connection with the arms and gripper-shaft to move the grippers toward the platen and coöperating cams on the gripper-shaft and platen-body for moving the grippers away from the platen, substantially as set forth.

3. In a platen-press the combination with a rotatable platen-body, a plurality of platens, and a rocking shaft journaled in the platen-body, spring-grippers in operative connection with the rocking shaft and an arm on the rocking shaft, of cams pivoted to the fixed frame, lever-and-link mechanism connecting the cams together, and a rotating cam acting on the lever-and-link mechanism to move the pivoted cams in practically the path of the rocking-shaft arm, substantially as set forth.

4. In a platen-press the combination with the fixed frame, a shaft rotatable in the frame, a platen-body fixed on the shaft and a plurality of platens on the platen-body, of a disk on the platen-shaft, projections on the disk, a locking-bolt engaging the disk, cam mechanism operatively connected with the bolt for engaging it with, and disengaging it from the disk, a spring-latch engaging the disk and eccentric pivot and stop for the latch, substantially as set forth.

5. In a platen-press the combination with the fixed frame, a shaft rotatable in the frame, a platen-body fixed on the shaft, a plurality of platens on the platen-body, a disk on the platen-shaft and a reciprocating locking-bolt engaging the disk, of an adjustable eccentric connecting the disk and platen-body, substantially as set forth.

6. In a platen-press the combination with the fixed frame, a delivery-board thereon, a platen-body pivoted therein, a plurality of platens on the platen-body and means operatively connected with the platen-body for intermittently rotating it, of arms pivoted to the frame, means operatively connected with the arms for vibrating them over the delivery-board, two shafts, one rotatable in the arms, grippers adjustable on these shafts, an arm on the rotatable shaft, two cams in practically the path of the said arm, and cam mechanism in operative connection with one of the cams for rocking it, substantially as set forth.

7. In a platen-press the combination with the fixed frame and the platen, and the bed reciprocally movable in the frame, of toggles connecting the bed with the frame, a crank device in operative connection with the joint connecting together the toggles, for vibrating the bed, an adjustable eccentric connecting the toggles with the vibrating bed, and lever-and-link mechanism operatively connected with the said eccentric, substantially as set forth.

8. In a platen-press the combination with the fixed frame and the platen, and the bed reciprocally movable in the frame, of toggles connecting the bed with the frame, crank mechanism in operative connection with the joint connecting together the toggles, for vibrating the bed, adjustable eccentrics connecting the toggles with the frame and with the vibrating bed, and lever-and-link mechanism operatively connected with the eccentric joining the toggles and the bed, substantially as set forth.

9. In a platen-press the combination with the fixed frame and the platen, and the bed reciprocally movable in the frame, of toggles connecting the bed with the frame, a crank device in operative connection with the joint connecting together the toggles, for vibrating the bed, adjustable eccentrics connecting the toggles with the frame and with the vibrating bed, lever-and-link mechanism operatively connected with the eccentric which connects the toggles and bed, and a rotating cam in operative connection with the lever-and-link mechanism, substantially as set forth.

In witness whereof I have hereunto set my hand in the presence of two witnesses.

EDWARD THOMAS CLEATHERO.

Witnesses:
 ARTHUR H. SMITH,
 HERBERT PARKER.